July 29, 1952  J. M. SCHMIED  2,604,972
ARTICLE CONVEYING AND STACKING APPARATUS
Filed May 10, 1950  2 SHEETS—SHEET 1
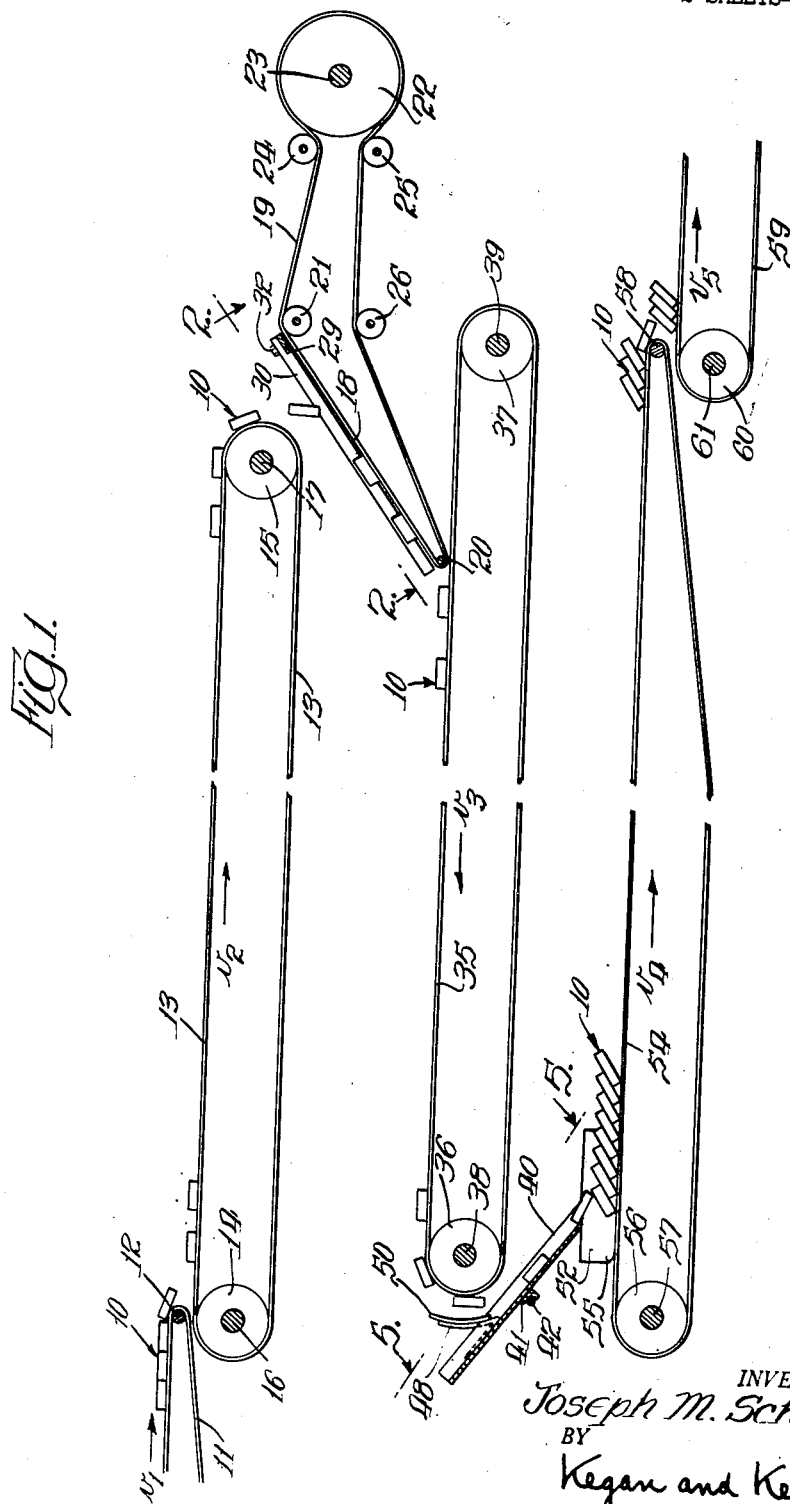
INVENTOR.
Joseph M. Schmied
BY
Kegan and Kegan
Attys July 29, 1952     J. M. SCHMIED     2,604,972
ARTICLE CONVEYING AND STACKING APPARATUS
Filed May 10, 1950     2 SHEETS—SHEET 2
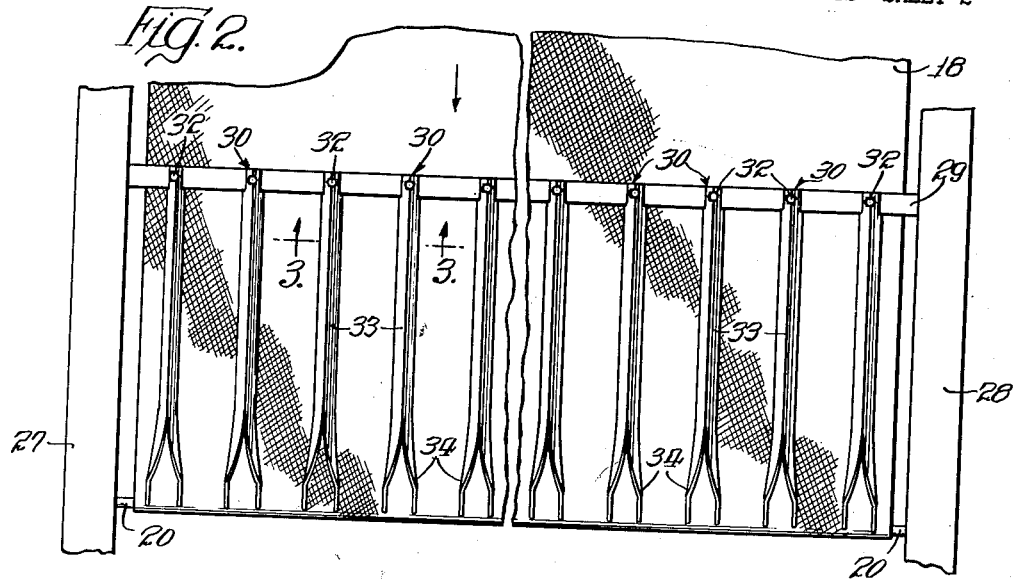
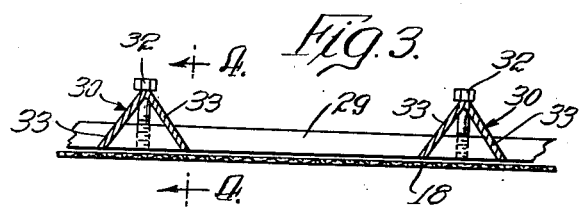
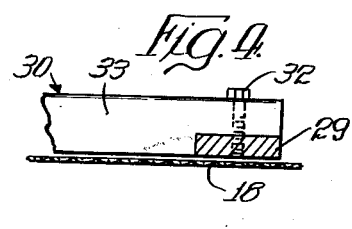
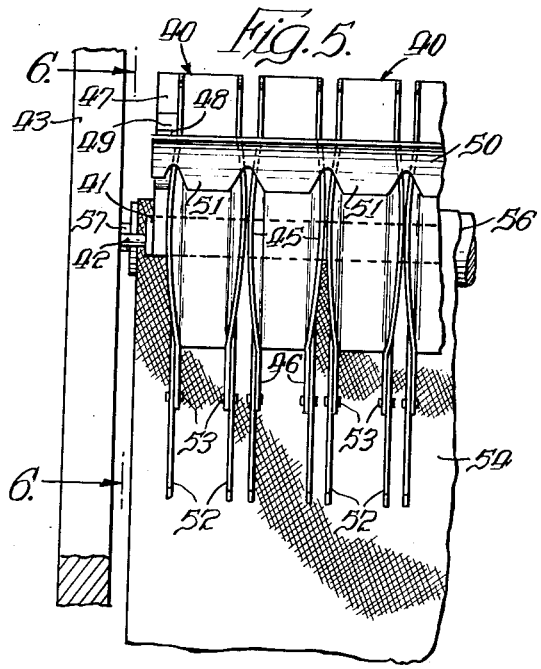
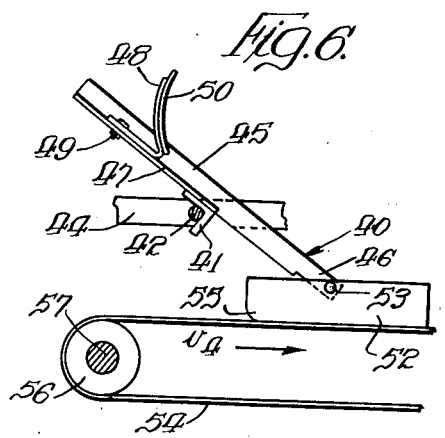
INVENTOR.
Joseph M. Schmied
BY
Kegan and Kegan
Attys.

Patented July 29, 1952

2,604,972

UNITED STATES PATENT OFFICE 2,604,972

ARTICLE CONVEYING AND STACKING APPARATUS

Joseph M. Schmied, Chicago, Ill., assignor to Schulze and Burch Biscuit Co., Chicago, Ill., a corporation of Illinois Application May 10, 1950, Serial No. 161,085

6 Claims. (Cl. 198—35)

My invention relates generally to apparatus for conveying and stacking loose articles. More particularly, my invention relates to apparatus for conveying and stacking loose comestibles such as fig bars, butter cookies, vanilla wafers, chocolate chip cookies, and cocoanut bars.

Before my invention, there was no completely satisfactory apparatus for automatically stacking loose comestibles in uniform rows preparatory to packaging said comestibles. This problem was especially acute in the baking industry, in the case of fig bars and other bakery products which leave the baking ovens at too high a temperature for immediate packaging, and which have a soft, sticky or gummy constituent. For example, in the manufacture of fig bars, the comestible is extruded in the form of long strips which leave the baking ovens at a temperature of approximately 300 degrees F. After the length of fig bar has been cut, it becomes a problem to cool the individual pieces for packaging, and to stack them to facilitate this operation. Because of the soft, sticky filling in such bakery products, it is important that the products be handled in such a way as to prevent their becoming marred or stuck to each other, and to avoid fouling the handling apparatus with the filling. Before my invention the practice was to station a number of operators on each side of the conveyor, solely for the purpose of stacking and aligning the articles in neat, even rows.

It is therefore a principal object of my invention to provide apparatus for conveying and stacking articles such as fig bars, butter cookies, vanilla wafers, and chocolate chip cookies without picking up the comestible or otherwise grasping or mechanically handling the same.

Another important object of my invention is to provide apparatus capable of automatically conveying and stacking fig bars and similar comestibles in neat rows preparatory to packaging the same.

Another object is to provide conveying and stacking apparatus of the type defined above which is of simple construction and dependable in operation.

To the end of achieving the foregoing objects, my invention comprises, in its broad aspect, a first conveyor belt positioned to receive articles from a moving conveyor on which said articles are closely spaced in one or more rows, means for moving said conveyor belt at a higher linear velocity than that of said conveyor whereby said articles are spaced apart on said first belt, a second conveyor belt and means for moving said second belt at substantially the same linear velocity as that of said first belt, the discharge end of said first belt being positioned above said second belt, first reversing means positioned to receive said articles from the discharge end of the first belt and to convey said articles on to said second belt, a third conveyor belt, the discharge end of said second belt being positioned above said third belt, second reversing means positioned to receive articles from the discharge end of the second belt and to convey said articles on to said third belt, and means for moving said third belt at a lower linear velocity than that of said conveyor, whereby said articles stack themselves on said third belt as they leave said second reversing means.

Apparatus conforming to my invention is characterized by the following special features: (1) the articles are not gripped or otherwise handled by mechanical fingers or tongs; (2) the reversing means can be in the form of chutes that are arranged to align and stack the comestibles in neat even rows; (3) the articles are cooled rapidly, by positioning each article first right side up for partial cooling, and then turning it over to complete the cooling; (4) the conveyor belts may be placed one over the other, to economize on valuable floor space; and (5) the entire operation of conveying, cooling, stacking and packaging can be automatic, without the articles being touched by human hands.

In order that my invention may be more fully disclosed reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a fragmentary side view, showing somewhat schematically a conveyor system embodying the present invention;

Figure 2 is a fragmentary top view as viewed from the line 2—2 of Figure 1, showing a first article reversing means;

Figure 3 is a fragmentary sectional view taken on the line 3—3 of Figure 2;

Figure 4 is a fragmentary side view taken in section on the line 4—4 of Figure 3;

Figure 5 is a fragmentary top view as viewed from line 5—5 of Figure 1, showing a second reversing means in the embodiment of Figure 1; and Figure 6 is a fragmentary side view taken in section on the line 6—6 of Figure 5.

Like reference characters designate like parts in the drawings and in the description of my invention which follows.

While it will be apparent to those skilled in the art that my apparatus may be used to advantage to convey and stack a wide variety of articles, for purposes of illustration I describe below the manner in which my apparatus is used commercially to convey, cool, and stack fig bars. Thus, in Figure 1, the cut, but unseparated fig bars, indicated generally by the numeral 10, are discharged from a conventional delivery conveyor 11, the discharge end of which is supported by the nose piece 12. The fig bars 10 on the conveyor 11 are still hot, and the filling therein is very soft and sticky. The conveyor belt 13 which receives the hot fig bars 10 from the conveyor 11, is supported by two rolls 14 and 15 on the shafts 16 and 17 respectively. The conveyor belt 13 is driven at a linear velocity $v_2$, which is greater than the linear velocity $v_1$ at which the conveyor 11 is driven; hence the fig bars 10 are separated and spaced apart from each other as they drop on to the conveyor belt 13.

As the fig bars 10 are conveyed right side up along the conveyor belt 13 toward the roll 15, said fig bars 10 are partially cooled, so that the soft and sticky filling normally associated with this product begins to harden somewhat. As the fig bars 10 are discharged from the conveyor belt 13, they fall on to the span 18 of the endless transfer belt 19 below the discharge end of the belt 13. Because the span 18 is below the discharge end of the belt 13 and is moving in a direction opposite to and downward from the direction of the span of the belt 13 which carries the fig bars 10, the fig bars 10 turn over and are carried upside down on the span 18. The upper side of the fig bars 10, which has been cooled and hardened while being conveyed by the belt 13, thus comes in contact with the span 18 and guides 30, and consequently there is less danger of smearing or damaging the fig bars 10 as they are transferred from the belt 13 to the span 18. The span 18 is supported by the nose piece 20 and the roll 21, while the transfer belt 19 is driven by the roll 22 on the shaft 23. Pinch rolls 24 and 25, and roll 26 provide further support for the transfer belt 19. Referring now to Figure 2, two frame members 27 and 28 are positioned on opposite sides of the span 18, and provide support for the nose piece 20. In addition, a bar 29 extends across the span 18 and provides support for a plurality of guide members 30. As best shown in Figure 4, the under side of each of the guide members 30 is undercut as at 31, to prevent the guide members 30 from shifting relative to the bar 29. A fastener 32 secures each of the guide members 30 to the bar 29.

Each of the guide members 30 has two side portions 33, 33 shaped generally in a V, except at the lower end of the guide members 30, at which point the side portions 33, 33 converge outwardly from each other. The guide members 30 thus form with the span 18 of the endless transfer belt 19 a plurality of chutes. In practice, I prefer that the spacing between adjacent guide members 30 be somewhat wider than the width of the article being handled, to allow some variation in the position of the fig bars 10 or other articles as they are discharged from the belt 13, as well as allow for the usual small variation in dimensions between different lots of fig bars. The flared side portions 33, 33 of the guide members 30 act to center the fig bars 10 as they fall onto the span 18, while the inwardly directed lower end portions 34, 34 further center and align the downwardly moving fig bars 10.

As the fig bars 10 are carried upside down to the end of the span 18, they are discharged with their upside down on to the conveyor belt 35, which is supported by the rolls 36 and 37 on the shafts 38 and 39, respectively. The conveyor belt 35 is moved beneath the span 18 of the transfer belt 19, at a linear velocity $v_3$, which is approximately equal to the linear velocity $v_2$ of the conveyor belt 13. Thus the spacing between successive fig bars 10 on the belt 35 is maintained approximately the same as the spacing on the belt 13. As the fig bars 10 move toward the roll 37, they are further cooled, so that as said bars 10 are discharged from the conveyor belt 35, the filling therein is reasonably hard and far less sticky than when the fig bars 10 were initially discharged on to the conveyor belt 13. Also, since the fig bars 10 were carried right side up on the conveyor belt 13 and upside down on the conveyor 35, both sides of the fig bars 10 have been cooled and have become reasonably firm.

As the rows of fig bars 10 fall from the discharge end of the conveyor belt 35, they drop into the chutes 40, which are best shown in Figures 5 and 6. More particularly, the chutes 40 are secured to the cross bar 41 on the rod 42, which rod is pivotally supported by the frame members 43 and 44. Each of the chutes 40 includes two sides 45, 45 which flare outwardly in the middle portion of the chute 40, but which converge toward each other at the lower end of the chute 40 to form two straight end portions 46, 46. As best shown in Figure 6, a strap 47 extends upwardly from the cross bar 41 on each end thereof. A bracket 48 is secured to each of the straps 47, by a fastener 49, and supports a deflector plate 50 which includes a plurality of tab portions 51 which extend into the chutes 40. Two guide plates 52, 52 are pivotally secured to the straight end portions 46, 46 of each of the chutes 40, by the pins 53, 53. The guide plates 52 ride on the endless conveyor belt 54, and to prevent the plates 52 digging into said belt 54, the lower trailing corner 55 of each of the guide plates 52 is rounded, as shown.

As the fig bars 10 fall from the conveyor belt 35, they are guided by the deflector plate 50 into the various chutes 40, the sides 45, 45 of which are flared to allow for a certain amount of misalignment of the rows of fig bars 10 on the conveyor belt 35. Any misalignment that occurs is due primarily to shifting of the belt 35 as it moves from beneath the nose piece 20 to the roll 36, since the reversing means of Figures 2–4 insure close alignment between the rows of fig bars 10 on the belt 35. As the fig bars 10 slide downwardly along the chutes 40, the converging lower portions thereof, which terminate in the straight end portions 46, 46, and the guide plates 52, 52, insure that the fig bars 10 are aligned accurately as they leave the chutes 40. The endless conveyor belt 54, which is shown as being supported by the roll 56 on the shaft 57, and the nose piece 58, is moving at a linear velocity $v_4$ which is substantially less than the linear velocity $v_1$ of the conveyor 11. Accordingly, as the fig bars 10 are discharged on to the conveyor belt 54, they are stacked in neat rows. Moreover, the fig bars 10 are stacked right side up, which is desirable since the fig bars 10 are more stable when stacked in this position, than when stacked up side down. The fig bars 10 are more stable when stacked right side up because the bottom side, which rested on a flat conveyor during baking, is flat and has straight edges, whereas the top side is slightly curved and has rounded edges, which might slip or slide on the conveyor belt 54.

If desired, the fig bars 10 on the endless belt 54 may be stacked additionally, by discharging them on to the endless belt 59, which is partially supported by the roll 60 on the shaft 61. In practice, the endless belt 59 is driven at a linear velocity $v_5$ which is less than the linear velocity $v_4$ of the conveyor belt 54. As the fig bars 10 move down along the conveyor belt 59, they are easily segregated in lots of predetermined number for packaging.

It will be noted that in the case of the reversing means of Figures 2-4, that the fig bars 10 are conveyed downwardly on the moving transfer belt 19. It is desirable at this point to prevent the yet warm fig bars 10 from sliding on or rubbing against surfaces of the reversing mechanism, since this would tend to cause these surfaces to be smeared with loose particles of the filling. As a result, the surface would become sticky, thus making the operation of the reversing means less efficient. By the time the fig bars 10 have reached the end of the endless belt 35, however, the filling has hardened sufficiently that this problem is no longer important; hence the chutes 40 can be used to advantage. It will be apparent, however, that if desired, reversing mechanism such as shown in Figures 2-4 can be substituted in place of the reversing mechanism of Figures 5 and 6. The arrangement shown is preferred, however, since the reversing means of Figures 5 and 6 is less costly to construct and operate than the reversing means of Figures 2-4.

By way of illustrating the advantages of my conveying and stacking apparatus, said apparatus has in actual commercial use led to considerable savings, both by increasing machine productivity and by eliminating hand labor previously required. Thus, using the system which preceded my invention, eight operators were required at each line to stack and align the fig bars preparatory to their being packaged, while the maximum output for each hour of operation of the line was approximately 3,500 fig bars. Advantageously, my conveying and stacking apparatus has not only increased the output of the line to 4,500 fig bars per hour, but has eliminated the need for the eight operators above mentioned. Thus, in this one case alone, the use of my invention has led to an increase in packaged fig bars of approximately 8,000 per eight hour shift on a single production line, while at the same time eliminating eight operators, or sixty-four man hours per shift. The great savings made possible by my invention are therefore manifest. In addition, by arranging the endless belt 59 to feed the stacked fig bars directly to automatic wrapping and packaging machinery, the entire process comprising baking, cutting, cooling, stacking, and packaging may be made wholly automatic, without the product ever being touched by human hands.

Having thus fully disclosed my novel conveying and stacking apparatus, and demonstrated its utility by reference to a specific embodiment thereof, I claim as my invention:

1. Apparatus for conveying and stacking articles which are closely spaced in a row on a moving conveyor, comprising: a first conveyor belt positioned to receive said articles from said conveyor, means for moving said conveyor belt at a higher linear velocity than that of said conveyor, whereby said articles are separated and spaced apart on said first belt, a second conveyor belt and means for moving said second belt at substantially the same linear velocity as that of said first belt, the discharge end of said first belt positioned above said second belt, first reversing means positioned to receive said articles from said discharge end of said first belt and convey said articles onto said second belt, comprising a transfer belt and support means for positioning a span of said transfer belt below said discharge end of said first conveyor belt and inclined toward said second belt, a pair of parallel spaced guide members overlying said span of said transfer belt; support means for said guide members, said guide members forming with said transfer belt a chute for guiding said articles onto said second belt, a third conveyor belt, the discharge end of said second belt positioned above said third belt, second reversing means positioned to receive said articles from said discharge end of said second belt and convey said articles onto said third belt, a support member above said third conveyor belt, a chute secured to said support member and inclined to extend from beneath said discharge end of said second belt to said third belt, a deflector plate carried by said support member and positioned adjacent to said discharge end of said second belt to guide said articles into said chute, and a pair of parallel guide plates secured to the lower end of said chute on opposite sides thereof to align said articles as they are discharged in stacked relation onto said third belt, and means for moving said third belt at a lower linear velocity than that of said conveyor, whereby said articles stack themselves on said third belt as they leave said second reversing means.

2. Apparatus for conveying and stacking articles which are closely spaced in a row on a moving conveyor, comprising: a first conveyor belt positioned to receive said articles from said conveyor, means for moving said conveyor belt at a higher linear velocity than that of said conveyor, whereby said articles are separated and spaced apart on said first belt, a second conveyor belt and means for moving said second belt at substantially the same linear velocity as that of said first belt, the discharge end of said first belt positioned above said second belt, first reversing means positioned to receive said articles from said discharge end of said first belt and convey said articles onto said second belt, comprising a transfer belt and support means for positioning a span of said transfer belt below said discharge end of said first conveyor belt and inclined toward said second belt, a pair of parallel spaced guide members overlying said span of said transfer belt; support means for said guide members, said guide members forming with said transfer belt a chute for guiding said articles onto said second belt, a third conveyor belt, the discharge end of said second belt positioned above said third belt, second reversing means positioned to receive said articles from said discharge end of said second belt and convey said articles onto said third belt, and means for moving said third belt at a lower linear velocity than that of said conveyor, whereby said articles stack themselves on said third belt as they leave said second reversing means.

3. Apparatus for conveying and stacking articles which are closely spaced in a row on a moving conveyor, comprising: a first conveyor belt positioned to receive said articles from said conveyor, means for moving said conveyor belt at a higher linear velocity than that of said conveyor, whereby said articles are separated and spaced apart on said first belt, a second conveyor belt and means for moving said second belt at substantially the same linear velocity as that of said first belt, the discharge end of said first belt positioned above said second belt, first reversing means positioned to receive said articles from said discharge end of said first belt and convey said articles onto said second belt, a third conveyor belt, the discharge end of said second belt positioned above said third belt, second reversing means positioned to receive said articles from said discharge end of said second belt and convey said articles onto said third belt, comprising a support member above said third conveyor belt, a chute secured to said support member and inclined to extend from beneath said discharge end of said second belt to said third belt, a deflector plate carried by said support member and positioned adjacent to said discharge end of said second belt to guide said articles into said chute, and a pair of parallel guide plates secured to the lower end of said chute on opposite sides thereof to align said articles as they are discharged in stacked relation onto said third belt, and means for moving said third belt at a lower linear velocity than that of said conveyor, whereby said articles stack themselves on said third belt as they leave said second reversing means.

4. Apparatus for cooling and stacking fig bars and the like which are disposed in rows on a moving conveyor, right side up in cut but unseparated form, comprising: a first conveyor belt positioned to receive said fig bars from said conveyor, means for moving said conveyor belt at a higher linear velocity than that of said conveyor, whereby said fig bars are separated and spaced apart on said first belt, a second conveyor belt positioned below said first belt and means for moving said second belt at substantially the linear velocity of said first belt, first reversing means for receiving said fig bars from said first belt and conveying them upside down onto said second belt, comprising an endless transfer belt and support means for positioning a span of said transfer belt below the discharge end of said first conveyor belt and inclined toward said second belt, a support bar extending across the upper portion of said span of said transfer belt and spaced to one side of said discharge end of said first conveyor belt, and a plurality of uniformly spaced guide members secured to said support bar and extending downwardly along said span of said transfer belt, each of said guide members having a generally V-shaped cross section which diverges toward said transfer belt, adjacent sides of each pair of said guide members further converging toward each other as said members approach said second conveyor belt, whereby fig bars which are discharged onto said span of said transfer belt are centered for discharge onto said second conveyor belt, a third conveyor belt positioned below said second belt, second reversing means for receiving said fig bars from said second belt and conveying them right side up onto said third belt, and means for moving said third belt at a lower linear velocity than that of said conveyor, whereby said fig bars stack themselves on said third belt as they leave said second reversing means.

5. Apparatus for cooling and stacking fig bars and the like which are disposed in rows on a moving conveyor, right side up in cut but unseparated form, comprising: a first conveyor belt positioned to receive said fig bars from said conveyor, means for moving said conveyor belt at a higher linear velocity than that of said conveyor, whereby said fig bars are separated and spaced apart on said first belt, a second conveyor belt positioned below said first belt and means for moving said second belt at substantially the linear velocity of said first belt, first reversing means for receiving said fig bars from said first belt and conveying them upside down into said second belt, a third conveyor belt positioned below said second belt, second reversing means for receiving said fig bars from said second belt and conveying them right side up onto said third belt, comprising a pivoted support bar above and extending across said third conveyor belt, a plurality of chutes secured to said support bar and inclined to extend from beneath the discharge end of said second belt to said third belt, each of said chutes including a bottom slide portion and two side portions extending beyond the lower end of said slide portion, said side portions flaring divergently outwardly just beneath said discharge end of said second belt, and converging toward each other at the lower end of said chute to center fig bars sliding down said slide portion, a deflector plate carried by said support bar and positioned adjacent to said discharge end of said second belt to guide said fig bars into said chutes, and a plurality of parallel guide plates each pivotally secured to a different one of said side portions of said chutes, said guide plates positioned at the lower end of said side portions to align said fig bars as they are discharged in stacked relation onto said third belt, and means for moving said third belt at a lower linear velocity than that of said conveyor, whereby said fig bars stack themselves on said third belt as they leave said second reversing means.

6. Apparatus for cooling and stacking fig bars and the like which are disposed in rows on a moving conveyor, right side up in cut but unseparated form, comprising: a first conveyor belt positioned to receive said fig bars from said conveyor, means for moving said conveyor belt at a higher linear velocity than that of said conveyor, whereby said fig bars are separated and spaced apart on said first belt, a second conveyor belt positioned below said first belt and means for moving said second belt at substantially the linear velocity of said first belt, first reversing means for receiving said fig bars from said first belt and conveying them upside down onto said second belt, comprising an endless transfer belt and support means for positioning a span of said transfer belt below the discharge end of said first conveyor belt and inclined toward said second belt, a support bar extending across the upper portion of said span of said transfer belt and spaced to one side of said discharge end of said first conveyor belt, and a plurality of uniformly spaced guide members secured to said support bar and extending downwardly along said span of said transfer belt, each of said guide members having a generally V-shaped cross section which diverges toward said transfer belt, adjacent sides of each pair of said guide members further converging toward each other as said members approach said second conveyor belt, whereby fig bars which are discharged onto said span of said transfer belt are centered for discharge onto said second conveyor belt, a third conveyor belt positioned below said second belt, second reversing means for receiving said fig bars from said second belt and conveying them right side up onto said third belt, comprising a pivoted support bar above and extending across said third conveyor belt, a plurality of chutes secured to said support bar and inclined to extend from beneath the discharge end of said second belt to said third belt, each of said chutes including a bottom slide portion and two side portions extending beyond the lower end of said slide portion, said side portions flaring divergently outwardly just beneath said discharge end of said second belt, and converging toward each other at the lower end of said chute to center fig bars sliding down said slide portion, a deflector plate carried by said support bar and positioned adjacent to said discharge end of said second belt to guide said fig bars into said chutes, and a plurality of parallel guide plates each pivotally secured to a different one of said side portions of said chutes, said guide plates positioned at the lower end of said side portions to align said fig bars as they are discharged in stacked relation onto said third belt, and means for moving said third belt at a lower linear velocity than that of said conveyor, whereby said fig bars stack themselves on said third belt as they leave said second reversing means.

JOSEPH M. SCHMIED.

REFERENCES CITED

The following references are of record in the file of this patent:

UNITED STATES PATENTS

| Number | Name | Date |
| --- | --- | --- |
| 760,417 | Budd | May 24, 1904 |
| 1,297,926 | Starr | Mar. 18, 1919 |
| 1,351,018 | Blando | Aug. 31, 1920 |
| 1,457,352 | Dreher | June 5, 1923 |
| 1,658,531 | Male | Feb. 7, 1928 |
| 2,006,091 | Walter | June 25, 1935 |
| 2,519,491 | Monaco | Aug. 22, 1950 |